Feb. 24, 1970                W. T. DEIBEL                3,497,037
                    STOP MECHANISM FOR A CAM BRAKE
Filed March 8, 1968                                  3 Sheets-Sheet 1
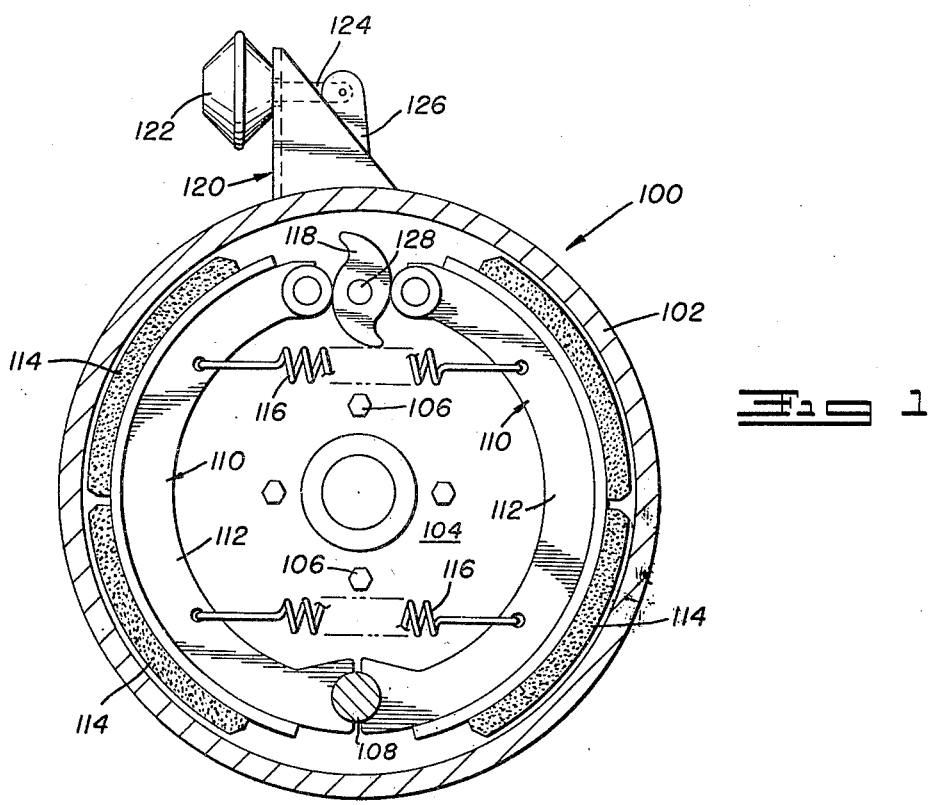
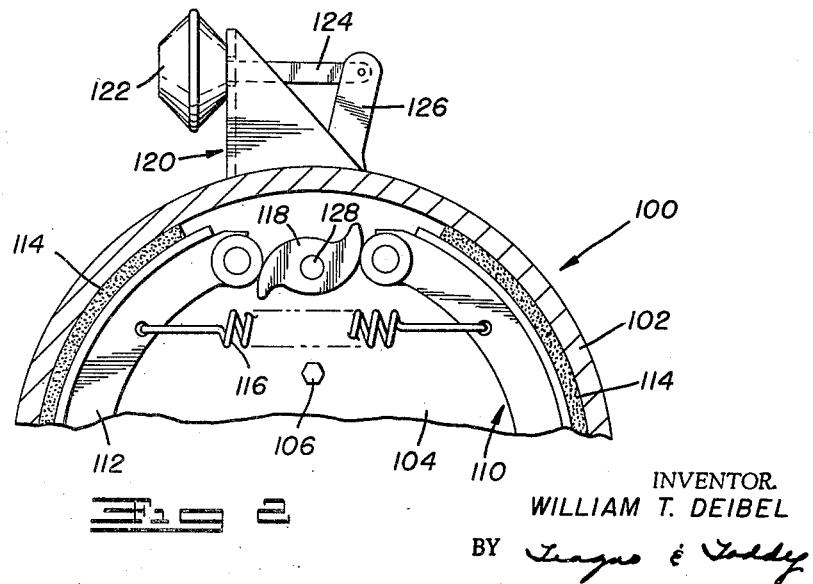
INVENTOR.
WILLIAM T. DEIBEL
BY
ATTORNEY

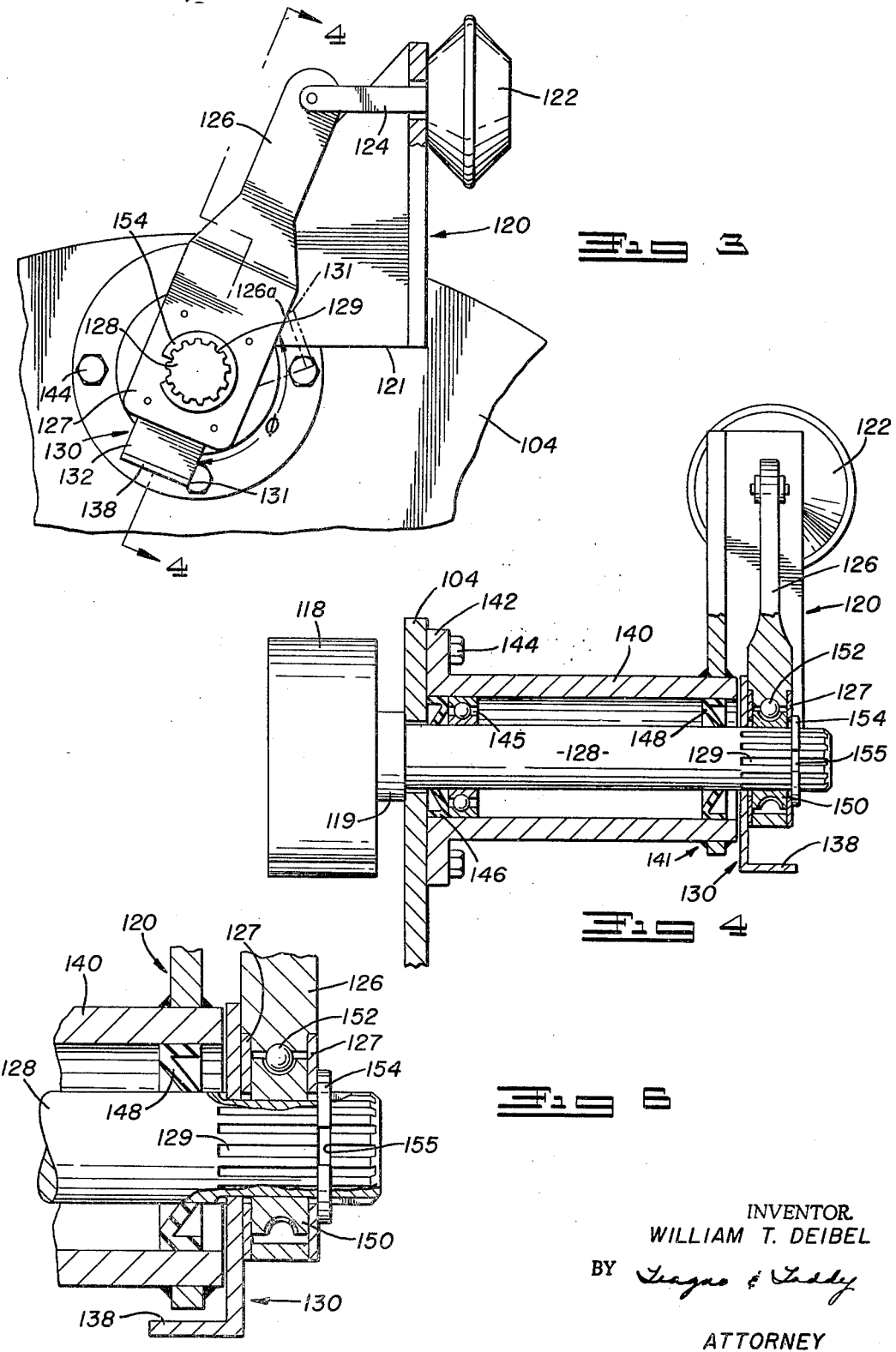

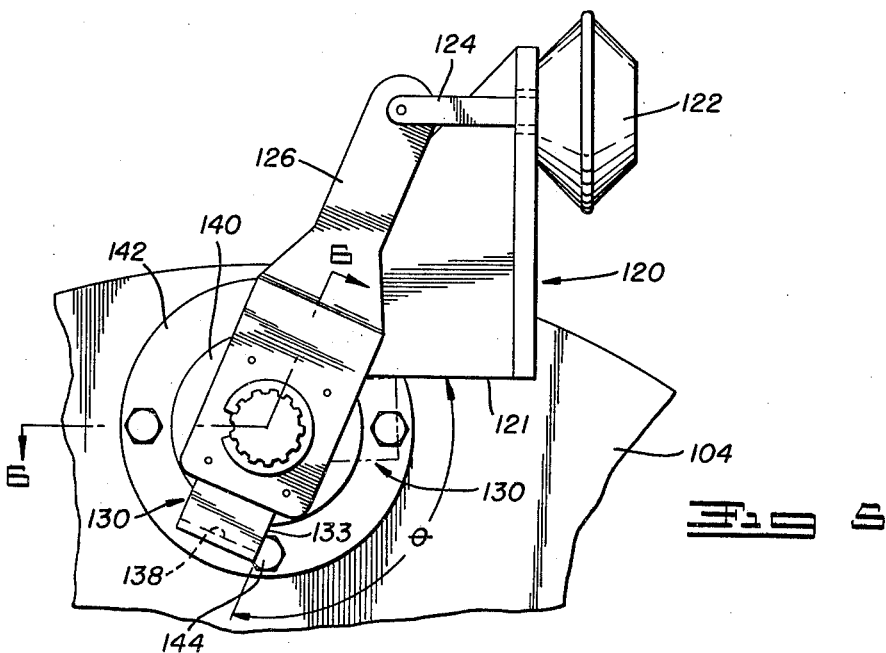
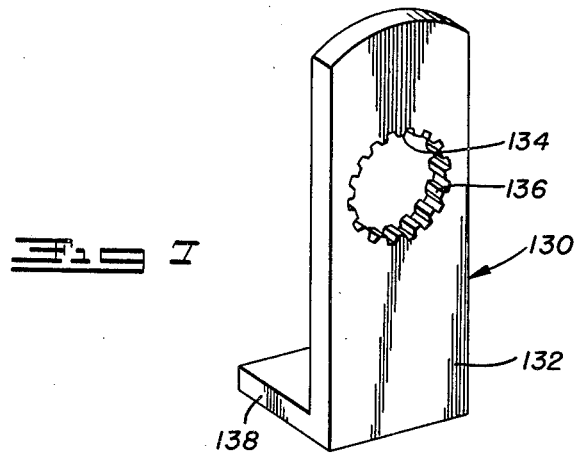

3,497,037
STOP MECHANISM FOR A CAM BRAKE
William T. Deibel, Marion, Ohio, assignor to Eaton Yale
& Towne Inc., Cleveland, Ohio, a corporation of Ohio
Filed Mar. 8, 1968, Ser. No. 711,789
Int. Cl. F16d 51/50
U.S. Cl. 188—78                                          4 Claims

ABSTRACT OF THE DISCLOSURE

A mechanism for use with a rotary cam actuated brake system for limiting the angular adjustment of the cam, in response to brake lining wear, to a maximum cam effectiveness position by limiting the angular adjustment of the cam with respect to a cam actuating lever.

BACKGROUND OF THE INVENTION

Field of invention

This invention relates to a novel, extremely simple, effective and universally adaptable mechanism for limiting cam rotation, in a cam actuated brake system, to an angular position with respect to a cam actuating lever, corresponding to the position of maximum brake shoe displacement.

Description of the prior art

Cam actuated brake systems wherein arcuate brake shoes nonrotatably secured to a portion of a wheeled vehicle are pivotally rotated into engagement with a rotating annular brake drum for the purpose of retarding the velocity of the wheeled vehicle by the use of a rotatable cam element are well known in the art. The rotatable cam element is located between adjacent ends of the pivotal brake shoes and is generally nonrotatably secured to a rotatable camshaft for rotation therewith. A lever is provided and nonrotatably secured to the camshaft for translating oscillatory linear motion from a power source to the camshaft and cam element.

The purpose of the cam element is to transform the rotary motion of the camshaft and cam element back into linear motion in order to expand the pivotally mounted brake shoes into engagement with the annular brake drum in order to retard movement of the vehicle.

As is further known, rotary cam elements used for expanding pivotal brake shoes have a limited range of effectiveness, that is, a cam element is capable of displacing the pivotal brake shoes only a limited distance.

Further rotation of the cam element beyond the position of maximum displacement will result in a lesser displacement of the brake shoes and a complete loss of braking effectiveness. Loss of braking effectiveness due to excessive cam element rotation is, of course, undesirable and further creates a very dangerous condition for the vehicle operator and for other persons and vehicles.

It is recognized that provision must be made for adjusting the position of the cam element with respect to the lever, as brake shoe lining is worn from repeated braking, in order to maintain the angular rotation of the cam element necessary to pivotally advance the brake shoes into engagement with the brake drum within the reasonable capabilities of known types of oscillatory linear motion power sources.

In the past and in many present systems, the means for adjusting the position of the cam element and camshaft relative to the lever have been, in the main, manual and have comprised a worm rotatably mounted within the lever with a tool engageable portion accessible from the exterior of the lever for manual rotation with an appropriate tool, and a worm gear nonrotatably secured to the camshaft, rotatably associated with the lever and in mating engagement with the worm, such that, rotation of the worm results in an advancement of the camshaft and cam element with respect to the lever.

However, advancing technology has provided means for automatically advancing the position of the camshaft and cam element with respect to the lever. One such automatic adjuster for cam actuated brakes is disclosed in copending application, U.S. Ser. No. 694,134, filed Dec. 28, 1967, in the name of James L. Oliver and assigned to the assignee of the present invention. Such adjuster senses excessive brake shoe clearance and automatically adjusts therefor.

With a manual adjuster, it was possible for a technician performing the manual adjustment to detect advancement of the cam element near or beyond the position of maximum displacement and to correct for such condition by a replacement of the worn brake lining on the vehicle. If the technician however, failed to visually observe the position of the cam and the worn condition of the brake linings, a very series condition existed as adjustments manually made to a point at or near the position of maximum displacement cannot be detected and upon application of the brakes by the operator, the cam element may very well pass the position of maximum displacement thereby creating the above-described extremely dangerous condition.

An automttic adjuster will, of course, continue to adjust the position of the camshaft and cam element relative to the lever in response to brake lining wear without regard to the camshaft position and may adjust the cam element past the position of maximum displacement without the knowledge of the vehicle operator until an attempt is made to utilize the ineffective brake system.

SUMMARY OF INVENTION

In order to solve the problems existing in the prior art, applicant has provided a simple, economical and highly effective means for preventing passage of the cam element beyond the position of maximum effectiveness and providing the vehicle operator with an indication that brake lining replacement is necessary, said means being effective with the use of either a manual or automatic adjuster.

The invention of the present case comprises a mechanism adapted to be nonrotatably secured to the camshaft and having an edge thereof indicative of the angular position of a maximum dimension of the cam element, said edge of the mechanism being further adapted to contact a portion of the vehicle brake assembly so as to be stopped and further rotation of the cam element with respect to a brake arm lever prevented when the cam element is in such a position that further rotation thereof with respect to the brake arm lever would permit an actuator to rotate the cam beyond the position where the brake shoes are displaced to a maximum extent due to contact with the cam element.

In accordance with the above summary of the present invention, it is a primary object of this invention to provide a simple, economical and universally adaptable mechanism for preventing a brake shoe actuating cam element from being rotated through greater than a predetermined angle.

It is another object of this invention to provide a mechanism which will give a vehicle operator a positive indication of the vehicle brake lining condition.

Other objects and features of this invention will be obvious to those persons skilled in the art by reference to the attached drawing and following description of a preferred embodiment thereof.

BRIEF DESCRIPTION OF THE DRAWING

FIGURE 1 is an illustration of a typical cam actuated opposed, expanding shoe brake system to which the invention of the present case is particularly adapted for use.

FIGURE 2 is a partial view of FIGURE 1 illustrating the cam element in a fully rotated position.

FIGURE 3 is a front elevation view of a preferred embodiment of the present invention.

FIGURE 4 is a partial sectional view of the vehicle brake assembly taken along the line 4—4 of FIGURE 3 and illustrating further the embodiment of FIGURE 3.

FIGURE 5 is a front elevation view of a further preferred embodiment of the present invention.

FIGURE 6 is generally similar to FIGURE 4 illustrating, however, the further embodiment of the present invention.

FIGURE 7 is a perspective view of the embodiment of the invention of FIGURES 3, 4, 5 and 6.

DESCRIPTION OF PREFERRED EMBODIMENT

In FIGURE 1 there is shown a vehicle brake assembly 100 comprising a generally annular rotatable brake drum 102 (shown in section), a brake support member or spider 104 nonrotatably secured to a portion of the vehicle by a plurality of suitable fasteners 106, a brake shoe pivot 108 secured to the spider 104, a pair of opposed, arcuate, brake shoes 110 including a braking lining support 112 and a brake lining 114 of suitable friction material, brake shoe return springs 116 and a cam element 118 for causing generally radially outward pivotal movement of the brakes shoes 110 and brake linings 114 about the pivot 108 and into engagement with the brake drum 102 for braking the movement of the vehicle in a known manner.

Also shown in FIGURE 1 is a brake actuator support 120 mounted on the spider 104. Secured to the actuator support 120 is an actuator 122. The actuator 122 produces an oscillatory movement in response to fluid pressure from a remote source (not shown). The oscillatory motion of the actuator 122 is transmitted to the cam element 118 through a linkage 124 to a lever 126, said lever 126 being adjustably secured to a camshaft 128. The cam element 118 is secured to the camshaft 128 for rotation therewith.

FIGURE 2 is a partial view, generally similar to FIGURE 1, wherein the cam element 118 is shown rotated to the position of maximum displacement. It can be seen that, if the cam element 118 is rotated further in a clockwise direction, the brake shoes 110 will be moved from a position of maximum displacement directly to a position of minimum displacement with a resultant complete loss of braking effectiveness.

In accordance with the primary object of this invention therefore, there is provided a mechanism for preventing further rotation of the cam element 118 in a clockwise direction from the position shown in FIGURE 2.

In FIGURE 3, the brake system assembly of FIGURES 1 and 2 is shown from the opposite side of the brake support member 104. More clearly seen in FIGURE 3 are the actuator support member 120, the actuator 122 and the lever 126.

Also shown in FIGURE 3 is the brake safety stop mechanism 130 of the present invention. The safety stop mechanism 130 is nonrotatably secured to the camshaft 128. The safety stop mechanism 130 is initially positioned on the camshaft 128 as shown in the solid line. The solid line position of the safety stop mechanism 130 corresponds to the initial position of the cam element 118 as illustrated in FIGURE 1.

The dashed line position of the stop mechanism 130 in FIGURE 3 corresponds to the maximum allowable relative rotative adjustment of the cam element 118 with respect to the lever 126 at zero stroke of the actuator 122. At full actuator 122 stroke, the cam element 118 is rotated to the maximum displacement position of FIGURE 2.

FIGURE 7 illustrates the safety stop mechanism 130 in greater detail. The stop mechanism 130, in the preferred embodiment, comprises a generally L-shaped plate member 132 having an opening 134 therethrough and means 136, such as internal spline teeth, for nonrotatably securing the stop mechanism 130 to the camshaft 128, said means 136 in the drawing being shown as internal spline teeth. The stop mechanism 130 further includes the short leg 138 of the L.

FIGURE 4 shows the stop mechanism 130 in position on the camshaft 128. The internal splines 136 cooperate with the external splines 129 of the camshaft 128 to form a nonrotatable connection therebetween.

Also shown in FIGURE 4 is a means for mounting the actuator support 120 and associated parts on the spider 104. The actuator support member 120 is welded, or otherwise secured to a generally cylindrical tube member 140. The tube 140 has a flange portion 142 which is adapted to abut the spider 104. A plurality of fasteners 144 removably secure the tube 140 to the spider 104.

Also shown in FIGURE 4 is a bearing 145 and seal member 146 for rotatably mounting the camshaft 128 in the tube 140. The camshaft 128 is provided with an enlarged shoulder portion 119 for positioning the cam element 118 with respect to the spider 104.

A second sealing member 148 is provided near the other end 141 of the tube 140 for rotatably supporting the camshaft 128 therein. Located adjacent the end 141 of the tube 140 and surrounding the camshaft 128 is the stop mechanism 130. The stop mechanism 130 provides an axial bearing surface against which a cover plate 127 of the lever 126 rides. Located within the lever 126 and nonrotatably secured to the camshaft 128 is a worm gear 150. The lever 126 also contains a rotatable worm 152 in mating engagement with the worm gear 150 for advancing the camshaft 128 relative to the lever 126 upon rotation of the worm 152. Worm 152 has a suitable screwdriver slot or bolt head end so that it can be rotated to establish and adjusted relation between the lever 126 and shaft 128, e.g. cam 118. This is conventional. Since stop mechanism 130 is secured to shaft 128, a relative adjustment between the lever 126 and the stop mechanism will also be provided.

Another lever coverplate 127 is provided and the entire assembly is axially located and held on the camshaft 128 by a conventional snap ring 154 which sits in a camshaft groove 155.

Having thus provided an operating environment for the stop mechanism 130, the operation thereof will now be briefly described.

With the cam element 118 in the zero displacement position of FIGURE 1 and the brake linings 114 unworn and with the stop mechanism 130 positioned as in FIGURE 3 on the camshaft 128, there exists between an edge 131 of the stop mechanism 130 and an edge 126a of the lever 126, an angle $\phi$ (phi) equivalent to the maximum effective angular rotation of the cam element 118. The angle $\phi$ is considerably greater than the angle of rotation of the cam element 118 which can be obtained from a single stroke of the oscillatory linear motion actuator 122. But as the adjustments are made for brake lining wear through the worm gear 150 and worm 152 assembly, either manually or automatically, there will exist, at times of extreme brake lining wear a condition whereby the stroke of the oscillatory actuator 122 will be sufficient to advance the cam element 118 to the maximum displacement position of FIGURE 2 and beyond.

However, the stop mechanism 130 is constructed in a manner that when the cam element 118 reaches the position of maximum displacement of FIGURE 2, by reason of the adjustment of the cam element 118 with respect to the lever 126 in order to compensate for brake lining wear, the edge 131 of the leg 138 of the stop mechanism 130 will contact the edge 126a of the lever 126 as shown in broken lines in FIGURE 3, and further rotation of the cam element 118 with respect to the lever 126 will be prevented, thus maintaining the maximum braking effort possible with worn brake linings.

In FIGURES 5 and 6 there is illustrated a further embodiment of the present invention wherein the stop mechanism 130 is positioned on the camshaft 128 such that the leg 138 thereof extends toward the tube member 140 or oppositely from that shown in FIGURES 3 and 4.

In FIGURE 6, the stop mechanism 130 would be angularly positioned on the camshaft 128 with unworn brake linings in an original position indicative of the zero displacement position of the cam element 118 of FIGURE 1, such that there would exist in FIGURE 5 an angle θ (theta) corresponding to the maximum effective angle of cam element 118 rotation.

In FIGURES 5 and 6, when the cam element 118 reached the angle of maximum displacement of FIGURE 2 due to adjustment relative to the lever 126 to compensate for worn brake linings, an edge 133 of the stop mechanism would contact an edge 121 of the actuator support member 120, or other rotationally stationary portion of the vehicle brake assembly and further rotation of the cam element 118 would be thereby prevented and the maximum braking effectiveness possible with worn brake shoes maintained.

It is to be recognized that although both embodiments, FIGURE 4 and FIGURE 6, are operable and preferred, there are certain particular advantages possessed by each.

The embodiment of FIGURES 3 and 4, for example, may be made lighter than the embodiment of FIGURES 5 and 6 since the stop mechanism 130 of FIGURES 3 and 4 need only withstand the torque necessary to prevent advancement of the camshaft 128 with respect to the lever 126, whereas the stop mechanism of FIGURES 5 and 6 must be capable of withstanding the torque generated by the actuator 122.

Further, the embodiment of FIGURES 3 and 4 provides a visual indication of brake lining condition when the actuator 122 is at zero stroke whereas the embodiment of FIGURES 5 and 6 would require visual inspection with the actuator 122 at full stroke position since the FIGURES 5 and 6 embodiment serves to prevent advancement of the cam element 118 beyond the maximum displacement position of FIGURE 2 upon application of the vehicle brakes, whereas the FIGURES 3 and 4 embodiment has a position relative to the lever 126 which may be visually gauged regardless of brake application.

However, both embodiments shown and described are fully operable and effective to limit the advancement of the cam element 118 with respect to the lever 126 due to adjustments made for brake lining wear and thereby prevent the cam element 118 from being forced by the actuator 122 beyond the maximum displacement position of the cam element 118 and the loss of braking caused thereby is effectively prevented.

What I claim is:

1. An apparatus effective to limit angular movement of the cam of a rotary cam actuated brake mechanism to the maximum cam displacement position of which the cam is capable, the cam being adjustable relative to its actuating lever to compensate for brake lining wear, the brake mechanism including opposed shoes pivotally mounted for movement of the linings into engagement with the brake drum, and a rotatable cam in engagement between the free ends of the shoes, the cam being secured to a rotatable shaft, a first lever secured to the shaft for rotative angular adjustment relative to the shaft, and power means connected to the first lever for moving the first lever to rotate the camshaft through an angular brake application displacement less than the maximum effective brake shoe displacement of which the cam is capable, a stop mechanism effective to limit cam movement to the maximum effective brake shoe displacement position of the cam, comprising second lever means fixed to said camshaft for rotation therewith, an abutment carried by said brake mechanism and engageable by said second lever means at the maximum displacement position of said cam with said first lever at rest, as the result of adjustment of said first lever relative to the camshaft, based on lining wear, the second lever having a maximum rotary movement angle defined as less than the zero to maximum displacement of said cam, and adjustment of said first lever relative to said camshaft to compensate for lining wear being effective to decrease said rotary movement angle of said second lever means.

2. The apparatus as defined in claim 1 wherein said second lever includes a leg engageable with said first lever as an abutment, at the maximum displacement position of said cam with said first lever at rest, as the result of adjustment of said first lever relative to the camshaft, based on lining wear.

3. The apparatus as defined in claim 1 wherein said second lever includes a leg engageable with a fixed abutment carried by said brake mechanism, at a position representing the maximum displacement position of said cam.

4. The apparatus as defined in claim 3 wherein the brake shoes are pivotally mounted to a brake support spider, and the fixed abutment is a bracket for the power means, secured to the brake support spider.

References Cited

UNITED STATES PATENTS

| | | |
|---|---|---|
| 3,076,531 | 2/1963 | Hanley. |
| 3,204,739 | 9/1965 | Moore _____ 192—139 |
| 3,308,474 | 3/1967 | Austin _____ 192—139 X |

MILTON BUCHLER, Primary Examiner

T. W. BUCKMAN, Assistant Examiner

U.S. Cl. X.R.

192—139